Patented Aug. 24, 1948

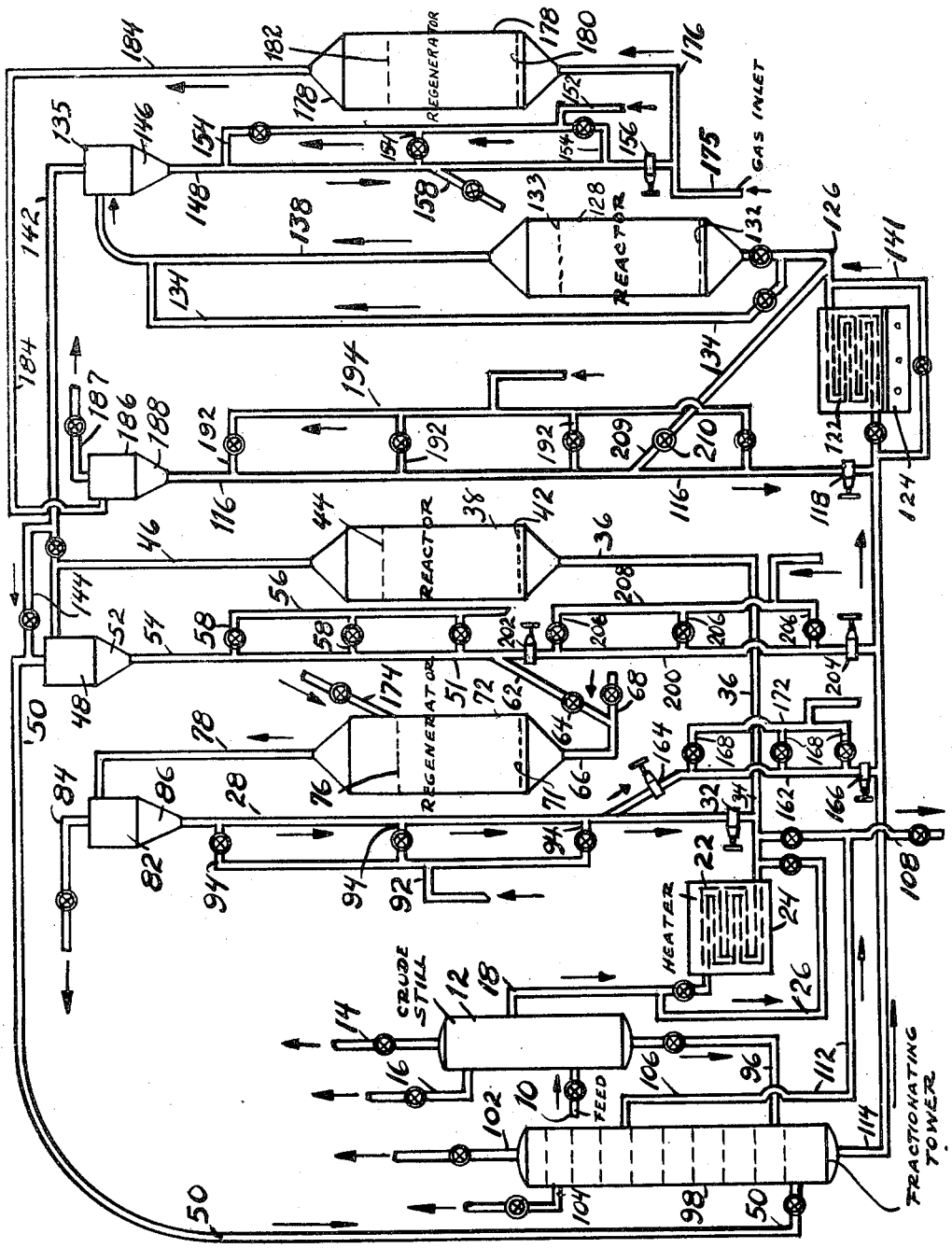

2,447,577

UNITED STATES PATENT OFFICE 2,447,577

TREATING HYDROCARBON FLUIDS

Charles E. Hemminger, Westfield, and Charles W. Tyson, Summit, N. J., assignors to Standard Oil Development Company, a corporation of Delaware Application March 25, 1943, Serial No. 480,448

15 Claims. (Cl. 196—52)

This invention relates to catalytic conversion of hydrocarbons and more particularly relates to catalytic conversion of residual stocks separate from lighter fractions from the same hydrocarbon feed stock.

According to our invention a crude oil, topped crude or a relatively heavy oil containing unvaporizable constituents is separated into a gas oil fraction which can be substantially completely vaporized and a residual hydrocarbon fraction containing vaporizable and unvaporizable constituents. The two hydrocarbon fractions are separately converted in different zones in the presence of a powdered catalyst as the optimum conditions are not the same for both fractions and this forms one of the advantages of our process. When residual oil is mixed with powdered catalyst, inorganic salts or material is deposited on the catalyst particles and the activity of the catalyst is reduced. By separate treatment of the two fractions a part of the catalyst from the heavy hydrocarbon cracking may be removed as desired and replaced by catalyst from the gas oil cracking and the activity of the catalyst maintained higher for both fractions by using fresh catalyst in the gas oil cracking step.

The gas oil fraction or lighter fraction is mixed with hot regenerated powdered catalyst and the mixture is passed to a reaction zone where proper temperatures and contact times are maintained to obtain the desired conversion. The reaction products in vapor form are separated from spent powdered catalyst and at least part of the spent catalyst may be mixed with the residual fraction or reduced crude oil for converting the residual fraction or reduced crude.

The residual oil is mixed with regenerated catalyst from the lighter oil cracking step and the mixture is passed through a heating zone to vaporize and convert the heavy or residual oil so that the unvaporized portions of the oil are absorbed on the catalyst and converted to lower boiling constituents. In this way the products of the conversion of the residual oil are only vapors and coke and the mixture leaving the heating zone comprises vapors and spent powdered catalyst. The reduced crude oil during the conversion deposits inorganic material on the catalyst and on regenerating the catalyst some of the inorganic material is decomposed to compounds which reduce the activity of the catalyst.

The heavy or residual oil is preferably passed through a separate reaction zone, or the conversion may be effected in the heating zone and the mixture of the reaction products and catalyst passed to a separating means to remove a large part of the vaporous reaction products from the powdered catalyst. A part or all of the spent powdered catalyst used for catalytic conversion of the heavy or residual oil is separately regenerated and returned for reuse in the catalytic conversion of the heavy or residual oil; or a part thereof may be regenerated in the same regeneration zone used for regenerating catalyst from the gas oil conversion zone.

The powdered catalyst used for the residual stock deteriorates faster because of the deposition of inorganic salts or material on the catalyst during vaporization and conversion of the residual oil stock. Make-up catalyst for the process is added to the catalyst stream passing to the gas oil conversion zone or to the regeneration zone so that fresh catalyst is used in the operation which results in less contamination of the catalyst. Make-up catalyst for the catalytic conversion of the heavy or residual oil is taken from the gas oil or lighter oil conversion zone after it has been used in the conversion of the lighter oil stock. In this way more active catalyst is maintained in both zones.

More specifically, petroleum crude oil is distilled in a crude still and the bottoms from this still are passed to a fractionating tower where they are mixed with reaction product vapors and entrained catalyst. Residual oil containing catalyst is withdrawn as bottoms from the fractionating tower. The residual oil fraction is then mixed with powdered catalyst as above pointed out.

In the drawing the figure represents one form of apparatus which may be used in carrying out our invention.

Referring now to the drawing, the reference character 10 designates a line for introducing crude petroleum oil or topped crude oil into a crude still 12. The crude still is heated in any suitable manner to vaporize a large portion of the crude oil. Virgin gasoline is taken overhead through line 14. A heavy naphtha fraction may be removed from the upper portion of the crude still through line 16. A relatively light gas oil fraction is removed from the still 12 through line 18 and may be passed through a heating coil 22 in heating zone 24 to vaporize the relatively light oil before it is mixed with hot regenerated catalyst. In cases where the hot regenerated catalyst is at a sufficiently high temperature and in a large amount, the gas oil fraction may be passed around heating zone 24 through line 26 as a liquid and mixed with the hot regenerated catalyst from standpipe 28 to vaporize the gas oil and to raise it to conversion temperature. Standpipe 28 is provided with a control valve 32 such as a slide valve for controlling the amount of catalyst introduced into line 34 for admixture with the gas oil.

The mixture of catalyst and oil vapors is then passed through line 36 into the bottom portion of a reaction zone 38 provided with a bottom distribution plate or grid member 42 arranged in the bottom portion of the reaction zone. The grid member functions to distribute evenly the powdered catalyst in the oil vapors across the cross-sectional area of the reaction zone. It is noted that the diameter of the reaction zone is much greater than the diameter of the inlet pipe 36 and due to this larger diameter there is a decrease in the velocity of the vapors passing upwardly through the reaction zone 38. The velocity of the vapors passing through the reaction zone is so selected that the mixture of powdered catalyst and oil vapors in the reaction zone 38 assume many of the characteristics of a liquid and form a fluidized mixture having a level 44 similar to a liquid.

The reaction products in vapor form and powdered catalyst pass overhead through line 46 to a separating means 48 for separating dry powdered catalyst from reaction vapors. The reaction vapors pass overhead through line 50. The separating means is shown as a cyclone separator in the drawing but other separating means may be used. While only one cyclone separator has been shown on the drawing, it is to be understood that two or three cyclone separators may be used in series to effect substantially complete separation of powdered catalyst from the reaction products in vapor form. The separated powdered catalyst is received in the bottom portion 52 of the cyclone separator and passed to a standpipe 54. The spent catalyst in standpipe 54 is regenerated as will be presently described. A portion of the spent catalyst may be used for converting residual stock as will be hereinafter described in greater detail. Standpipe 54 is provided with a manifold 56 and branch lines 58 for introducing aerating gas into the powdered catalyst in the standpipe to maintain it in fluidized condition.

All or a portion of the spent catalyst is passed through a short standpipe 62 which branches off the lower portion of standpipe 54 and which is provided with a control valve 64 near its lower portion for controlling the amount of catalyst being introduced into line 66. Regenerating gas such as air, other oxygen-containing gas or other gas is introduced into line 66 through line 68 and the mixture is passed upwardly into the lower portion of a regeneration zone 72 provided with a bottom distribution plate or grid member 71. The grid member acts to distribute evenly the powdered material and gases across the area of the regeneration zone. The regeneration zone has a much larger diameter than the inlet pipe 66 and because of this increase in diameter there is a decrease in the velocity of the gases passing through the regeneration zone.

The velocity of the gases passing through the regeneration zone is so selected that the powdered catalyst assumes the appearance of a liquid having a level 76. The powdered catalyst is in a turbulent condition and good mixing is effected so that the temperature during regeneration is substantially uniform throughout the fluidized mixture in the regeneration zone.

Regenerated powdered catalyst and regeneration gases pass overhead through line 78 to a separating means 82 which is shown as a cyclone separator in the drawing. Other separating means may be used. More than one cyclone separator may be used. If desired, a Cottrell precipitator may be used as a final separating means to separate substantially all of the powdered catalyst from the regeneration gases.

The regeneration gases pass overhead through line 84 to the atmosphere and the separated regenerated catalyst is collected in hopper 86 of the separating means 82 from which it is passed to a standpipe 28. The standpipe 28 is provided with a manifold 92 and branch lines 94 for introducing aerating gas into the standpipe to maintain the regenerated catalyst in fluidized condition so that a hydrostatic pressure is developed at the bottom of the standpipe. The regenerated catalyst is fed into the line 34 as above described.

Returning now to the crude still 12, the reduced crude oil or bottoms are removed from the bottom through line 96 and passed into the lower portion of a fractionating tower 98. The reaction product vapors from the separating means 48 are passed through line 50 into the bottom portion of the fractionating tower 98. These vapors are at a relatively high temperature and as they are introduced into the tower 98 below the point of introduction of the bottoms through line 96, the bottoms are further vaporized and heat is supplied for fractionating the vapors. A catalytically cracked gasoline is taken overhead from the fractionating tower 98 through line 102. A heating oil may be removed as a relatively light fraction through line 104. A gas oil fraction is removed through line 106 and a portion of this fraction may be removed from the system through line 108. All or a portion of the gas oil fraction may be passed through line 112 and introduced into line 34 where it is mixed with gas oil coming from the crude still 12 before the other oil is mixed with the regenerated catalyst.

Reduced crude oil along with any unrecovered catalyst coming to fractionator 98 through line 50 is withdrawn from the bottom of the fractionating tower 98 through line 114. The reduced crude is mixed with regenerated catalyst from standpipe 116 which contains regenerated catalyst from the crude oil cracking step presently to be described. Standpipe 116 is provided with a control valve 118 at its lower end to control the amount of catalyst being mixed with the reduced crude oil or bottoms passing through line 114.

The mixture of residual oil and powdered catalyst is preferably passed through a heating coil 122 in heating zone 124 to vaporize at least a portion of the oil and to convert the unvaporizable constituents to coke and lighter constituents so that a dry mixture results. The dry mixture of partly converted products and powdered catalyst is then passed through line 126 and is preferably introduced into a separate reaction zone 128 provided with a grid member 132 wherein the catalyst is in a dry fluidized mixture having a level 133. Reaction zone 128 is similar to reaction zone 38 above described and the hydrocarbons are further catalytically converted to form motor fuel constituents. Instead of passing through the separate reaction zone 128, the heating coil 122 may serve as the reaction zone and the vaporous reaction products and powdered catalyst as a dry mixture may be passed through line 134 to a separating means 135.

Where a separate reaction zone 128 is used, the dry reaction product vapors and dry powdered catalyst pass overhead through line 138 to the separating means 135 above referred to.

Where the reduced crude oil in line 114 is at a sufficiently high temperature and a sufficient amount of hot catalyst is used, the heating zone 124 may be omitted and the reduced crude oil and powdered catalyst passed through line 141 around the heating zone 124 and into line 134 to separating means 135 wherein dry catalyst powder is separated from dry vapors. The separation means is shown as a cyclone separator on the drawing but other separating means may be used and more than one cyclone separator may be used. The vapors containing entrained catalyst pass overhead through line 142 and may be passed through separating means 48 but are preferably passed through by-pass line 144 which connects with line 50.

The separated catalyst is collected in the bottom 146 of the separating means 135 and introduced into a standpipe 148 provided with manifold 152 and branch aerating lines 154 and control valve 156. The separated catalyst is regenerated as will be described hereinafter. The residual oil deposits inorganic salts or material on the catalyst and this catalyst loses its activity faster than does the catalyst used for cracking or conversion of gas oil or relatively light stocks in the reaction zone 38. By using a separate catalyst for the residual oil conversion, a portion of the deactivated catalyst can be removed from the system through valved line 158 leading from standpipe 148.

The removed catalyst is replaced by catalyst from the system in which gas oil or the lighter hydrocarbon is converted. For example, regenerated catalyst from standpipe 28 is passed to branch standpipe 162 having a top control valve 164 and a bottom control valve 166. The desired amount of make-up catalyst for the reduced crude conversion is introduced into line 114 from standpipe 162. Standpipe 162 has aerating lines 168 and a manifold 172 for feeding suitable aerating gas thereto to maintain the catalyst in dry fluidized condition. By removing spent catalyst from the residual conversion step and replacing it with regenerated catalyst from the gas oil or lighter hydrocarbon conversion step, the activity of the catalyst in both systems is maintained at a higher level.

Fresh make-up catalyst is supplied to the regeneration zone 72 through line 174 as desired and this fresh catalyst is used in the conversion zone 38 wherein the gas oil or lighter hydrocarbon stock is converted. In this way the fresh catalyst is first used where it is least deactivated and is then transferred to the residual oil conversion step where greater deactivation occurs.

The regeneration of the spent catalyst from standpipe 148 will now be described. The catalyst is mixed with a regenerating gas such as air introduced through line 175 and the mixture passed through line 176 and into the bottom of a second regeneration zone 178 having a bottom grid member 180. Regeneration zone 178 is similar to regeneration zone 72 and the powdered catalyst is in a dry fluidized condition during regeneration and has a level indicated at 182. The regenerated catalyst and regeneration gases pass overhead through line 184 to a separation means 186 for separating regenerated catalyst from regeneration gases. Other separation means may be used. More than one cyclone separator may be used and as a last separation means a Cottrell precipitator may be used. The regeneration gases leave through line 187 and may be vented to the atmosphere.

The separated regenerated catalyst accumulates in the bottom 188 of separation means 186 and is introduced into standpipe 116 in which the regenerated catalyst is maintained in dry fluidized condition by aerating lines 192 fed from manifold 194 to produce a hydrostatic pressure at the bottom of the standpipe 116. This regenerated catalyst is used for the reduced crude oil reconversion.

Instead of using only regenerated catalyst from standpipe 116 for the reduced crude oil conversion and make-up regenerated catalyst from standpipe 162 for the reduced crude oil conversion, a portion of the spent catalyst from the gas oil or relatively light hydrocarbon stock conversion step may be used. Spent catalyst from this last mentioned step is passed into standpipe 200 having top control valve 202 and bottom control valve 204. Standpipe 200 feeds into line 114 conveying reduced crude oil and bottoms containing recycle stock from fractionator 98. Aerating lines 206 and manifold 208 are provided for aerating the spent catalyst in standpipe 200.

The catalyst from hopper bottom 188 may also be introduced into line 126 after furnace 124 through standpipe 209, a division of standpipe 116 and regulated by valve 210.

In cases where the crude oil has a very high salt content it may be desalted before being used in this process.

A specific example of catalytic conversion of hydrocarbon oil will now be given but it is to be understood that the example is by way of illustration only and the invention is not to be limited to the specific example. A crude oil such as an East Texas crude having an A. P. I. gravity of about 37.5° is introduced into the crude still 12. Virgin gasoline is removed through line 14 and virgin heavy naphtha through line 16. A gas oil boiling between about 450° F. and 850° F. is removed through line 18. The temperature of this gas oil is about 125° F. The catalyst may be any suitable cracking catalyst such as acid treated bentonite clays, synthetic silica alumina gels or silica magnesia gels, etc. The catalyst is of a size between about 200 and 400 standard mesh and finer. For the cracking of the gas oil to produce high octane gasoline the catalyst to oil ratio by weight is about 3 to 25 with 5 to 15 preferred.

Where the regenerated catalyst in standpipe 28 is at a temperature of about 1100° F. and where a relatively large ratio of catalyst to oil is used, there is sufficient heat supplied by the catalyst to vaporize the gas oil and raise it to a temperature of about 875° F. to 900° F. in the reaction zone 38 to bring about the desired conversion. The separated reaction product vapors passing through line 50 are at a temperature of about 900° F.

The bottoms from crude still 12 are at a temperature of about 725° F. and these bottoms are mixed in fractionator 98 with the reaction product vapors from line 50 to flash off any volatile constituents from the reduced crude oil. The residual oil passing from the bottom of fractionating tower 98 through line 114 is at a temperature of about 800° F. The residual oil is mixed with regenerated powdered catalyst from standpipe 116. More than about three parts of catalyst by weight to one part of oil by weight is used as for example 10 to 30 parts of catalyst to one of oil, usually double that for gas oil operations. The residual oil is heated by admixture with the hot regenerated catalyst to a temperature of about 950° F. to 1050° F. and the residual oil is maintained in reaction zone 128 at this temperature in the presence of the catalyst for about 0.5 minute to effect the conversion of the residual oil to gasoline, gas oil and coke which is deposited on the catalyst.

From the above, it will be seen that the residual oil is cracked at a higher temperature than the temperature used for cracking the gas oil in reaction zone 38. Also, preferably larger amounts of catalyst per unit of oil are used in cracking the reduced crude bottoms than is used in cracking the gas oil in the reaction zone 38. By separately cracking these different fractions, the yield of motor fuel or gasoline is increased and better gasoline is produced. In addition, the process may be so carried out that catalyst which is deactivated by reduced crude oil may be removed from the system and replaced by spent catalyst from the gas oil cracking step in the process, fresh make-up catalyst being added to the gas oil cracking step.

Furthermore, this invention contemplates the use of a residual stock containing non-vaporizable constituents as a feed stock for a catalytic cracking operation. In this operation a sufficient amount of powdered catalyst is used to adsorb the liquid and sufficient heat is supplied either by the powdered catalyst or by heating means to vaporize and convert the residual oil to vapors and coke or carbonaceous material so that the mixture of residual oil and catalyst after mixing and heating forms a dry mixture which can be passed through pipes or vessels as a suspension.

When spent catalyst is removed from the reduced crude oil conversion step through line 158, make-up catalyst is supplied from the gas oil conversion step through standpipe 162. Fresh catalyst is then added to the gas oil conversion step through line 174. The catalyst in the gas oil conversion step has a higher activity because the catalyst is added to and removed from the system at a higher rate than would be normally accomplished in the gas oil conversion step. The activity of the catalyst in the reduced crude oil conversion step will be greater for the same reason and also for the reason that the amount of inorganic material deposited from the reduced crude or other heavy oil will be less per unit of catalyst than if the reduced crude oil conversion step were fed with fresh catalyst above.

Instead of using the type of vessel or zone shown in the drawing where the reaction products or gases and powdered catalyst pass overhead, we may use reaction zones or vessels including regeneration zones or vessels where the vapors or gases pass overhead with a small amount of entrained catalyst but the bulk of the catalyst is taken off from the bottom of the reaction zones and introduced into a standpipe associated with the respective zones from which it is circulated to another part of the process.

This invention is not restricted to the processing of the separate cuts of a given crude but may be used to process any two oils, one a gas oil or the like and the other a residual or contaminated oil (containing materials affecting catalyst activity) from any source.

While we have shown one form of apparatus and have given one specific example of a hydrocarbon conversion process, it is to be understood that these are by way of illustration only and modifications and changes may be made without departing from the spirit of our invention.

We claim:

1. A process for treating hydrocarbon fluids which comprises separating a hydrocarbon oil into a residual oil fraction containing vaporizable and unvaporizable constituents and a condensate fraction, contacting the condensate fraction with hot catalyst particles to vaporize the condensate fraction and raise it to conversion temperature, passing the mixture into a reaction zone, separating vaporous reaction products from dry spent catalyst, mixing the residual oil fraction with hot regenerated catalyst, heating the residual oil fraction and catalyst to a higher temperature than said first mentioned temperature to convert and substantially completely vaporize the residual oil fraction leaving unvaporized deposits on the catalyst, separating vaporous reaction products from dry spent catalyst, regenerating at least a portion of the first mentioned spent catalyst and using most of the regenerated hot catalyst for admixture with the condensate fraction and at least a part as the catalyst for the residual oil fraction conversion.

2. A process according to claim 1 wherein at least part of the first mentioned spent catalyst is mixed with the residual oil fraction.

3. A process according to claim 1 wherein the first mentioned spent catalyst is regenerated and the regenerated catalyst is used as make-up catalyst for the residual oil fraction conversion, at least part of the second mentioned spent catalyst is removed from the system and fresh make-up catalyst is used for the condensate fraction conversion step.

4. A process for treating hydrocarbon fluids which comprises separating a hydrocarbon oil into a residual fraction containing inorganic material and a gas oil, heating the gas oil, mixing the heated gas oil with catalyst particles in a reaction zone, separating vaporous reaction products from spent catalyst, regenerating the spent catalyst, mixing the residual fraction with at least a part of the regenerated catalyst to form a dry mixture, heating the residual fraction and catalyst to substantially completely vaporize the residual oil by converting heavy ends to vapors and coke, separating vaporous reaction products from dry coked catalyst, regenerating the last mentioned catalyst and using at least part of it for admixture with the residual fraction.

5. A process for treating hydrocarbon fluids which comprises separating a hydrocarbon oil into a condensate oil and a residual fraction, mixing the condensate oil with hot regenerated powdered catalyst to vaporize the oil and raise it to conversion temperature, passing the mixture into a reaction zone, removing reaction products and spent catalyst from said reaction zone, regenerating the withdrawn spent catalyst, mixing the residual fraction with at least a part of the regenerated catalyst, heating the residual oil and catalyst to convert the residual fraction to vapors and unvaporized residues deposited on the catalyst and to form a dry mixture, separating dry reaction products from the last mentioned dry catalyst, regenerating at least a portion of the last mentioned catalyst and using the regenerated hot catalyst for admixture with the residual fraction.

6. A process according to claim 5 wherein the temperature for converting the condensate oil is lower than the temperature of conversion of the residual fraction.

7. A process according to claim 5 wherein the catalyst to oil ratio is higher for the conversion of the residual fraction than for the conversion of the condensate oil.

8. A process for treating hydrocarbon fluids which comprises separating a hydrocarbon oil into a residual fraction containing inorganic material and a condensate oil, mixing the condensate oil with powdered catalyst and heating the oil to conversion temperature, passing the mixture into a reaction zone, separating vaporous reaction products from spent catalyst, regenerating the catalyst, passing the residual fraction to a fractionating zone, contacting the residual fraction with hot vaporous reaction products to heat the residual fraction and cool the reaction products, removing bottoms from said fractionating zone, mixing the bottoms with at least a part of the regenerated catalyst, heating the bottoms and catalyst to convert the bottoms to vapors and deposit inorganic and organic material on the catalyst, separating vaporous reaction products from the last mentioned dry spent catalyst, regenerating at least a portion of the last mentioned catalyst and using the regenerated catalyst for admixture with the bottoms.

9. A process for treating hydrocarbon fluids which comprises separating a hydrocarbon oil into a condensate oil and a residual fraction, mixing the condensate oil with hot regenerated powdered catalyst to vaporize the oil and raise it to conversion temperature, passing the mixture into a reaction zone, separating reaction products from spent catalyst, regenerating at least a portion of the spent catalyst in a regeneration zone, mixing the residual fraction with at least a portion of the regenerated catalyst, heating the residual fraction and catalyst to convert the residual fraction to vapors and coke and to form a dry mixture, separating reaction products from the last mentioned catalyst, regenerating the last mentioned catalyst in another regeneration zone, using the last mentioned regenerated catalyst at least in part for admixture with the residual fraction and removing another part of the last mentioned regenerated catalyst from the system.

10. A process according to claim 9 wherein make-up catalyst for the condensate oil conversion is fresh catalyst and make-up catalyst for the residual fraction is part of the first mentioned regenerated catalyst.

11. A process for treating hydrocarbon fluids which comprises separating a hydrocarbon oil into a condensate oil and a residual fraction, mixing the condensate oil with hot regenerated powdered catalyst to vaporize the oil and raise it to conversion temperature, converting said oil in the presence of said catalyst, separating conversion products from spent catalyst, regenerating at least a part of the spent catalyst, mixing the residual fraction with at least a part of the spent catalyst and part of the regenerated catalyst, heating the residual fraction and catalyst to convert the residual fraction to vapors and unvaporized residues deposited on the catalyst and to form a dry mixture, separating reaction products from the last mentioned catalyst, regenerating at least a portion of the last mentioned catalyst and using the last mentioned regenerated hot catalyst for admixture with the residual fraction.

12. A process according to claim 11 wherein fresh make-up catalyst is added to the condensate oil conversion step.

13. A process for treating hydrocarbon fluids which comprises separating a hydrocarbon oil into a residual oil fraction containing vaporizable and unvaporizable constituents and a condensate fraction, contacting the condensate fraction with catalyst particles in a reaction zone maintained under reaction conditions, separating vaporous reaction products from dry spent catalyst, contacting the residual oil fraction with solid particles in a second reaction zone maintained under such conditions to convert the residual oil fraction to vapors and unvaporized deposits which collect on the solid particles, separating vaporous reaction products from substantially dry solid particles, regenerating at least a portion of the spent catalyst and recycling most of the regenerated catalyst to said first reaction zone and at least a part of the regenerated catalyst to said second reaction zone.

14. A process for treating hydrocarbon fluids which comprises mixing a gas oil with catalyst particles in a reaction zone maintained under conversion conditions wherein gas oil vapors are converted to gasoline, separating vaporous reaction products from dry spent catalyst, regenerating the spent catalyst, recycling at least part of the regenerated catalyst to said reaction zone, mixing a liquid residual oil containing vaporizable and unvaporizable constituents with catalyst particles in a second reaction zone maintained under conversion conditions to convert the residual oil to vapors and coke which is deposited on the catalyst particles, separating the last mentioned vaporous reaction products from dry coked catalyst, regenerating the last mentioned catalyst, recycling at least part of the last mentioned regenerated catalyst to said second reaction zone and using at least part of the first mentioned regenerated catalyst as make-up catalyst for the residual oil conversion step and adding fresh active catalyst to said first reaction zone as make-up catalyst so that the most active catalyst is in said first reaction zone and less active catalyst is in said second reaction zone.

15. A method according to claim 14 wherein the conversion temperature in said second reaction zone is higher than in said first reaction zone.

CHARLES E. HEMMINGER.
CHARLES W. TYSON.

REFERENCES CITED

The following references are of record in the file of this patent:

UNITED STATES PATENTS

| Number | Name | Date |
|---|---|---|
| 2,235,133 | Zimmerman | Mar. 18, 1941 |
| 2,271,645 | Kanhofer | Feb. 3, 1942 |
| 2,296,722 | Marancik et al. | Sept. 22, 1942 |
| 2,308,557 | Watson | Jan. 19, 1943 |
| 2,309,137 | Peterkin | Jan. 26, 1943 |
| 2,312,445 | Ruthruff | Mar. 2, 1943 |
| 2,322,019 | Hemminger | June 15, 1943 |
| 2,324,165 | Layng et al. | July 13, 1943 |
| 2,339,874 | Nysewander | Jan. 25, 1944 |
| 2,341,193 | Scheineman | Feb. 8, 1944 |
| 2,358,888 | Thomas | Sept. 26, 1944 |